(12) United States Patent
Liechti et al.

(10) Patent No.: US 9,394,626 B2
(45) Date of Patent: Jul. 19, 2016

(54) METHOD FOR TREATING A MONOMER, PRE-POLYMER, POLYMER OR A CORRESPONDING MIXTURE

(75) Inventors: Pierre Liechti, Muttenz (CH); Reinhard Geisler, Schopfheim (DE); Manuel Steiner, Basel (CH)

(73) Assignee: List Holding AG, Arisdorf (CH)

( * ) Notice: Subject to any disclaimer, the term of this patent is extended or adjusted under 35 U.S.C. 154(b) by 516 days.

(21) Appl. No.: 13/390,062

(22) PCT Filed: Aug. 6, 2010

(86) PCT No.: PCT/EP2010/004822
§ 371 (c)(1),
(2), (4) Date: Feb. 10, 2012

(87) PCT Pub. No.: WO2011/018189
PCT Pub. Date: Feb. 17, 2011

(65) Prior Publication Data
US 2012/0140587 A1 Jun. 7, 2012

(30) Foreign Application Priority Data
Aug. 11, 2009 (DE) .................. 10 2009 036 915

(51) Int. Cl.
*B28C 7/04* (2006.01)
*B28C 5/00* (2006.01)
(Continued)

(52) U.S. Cl.
CPC .............. *D01D 1/02* (2013.01); *B29C 47/0021* (2013.01); *B29C 47/10* (2013.01); *D01F 6/605* (2013.01); *B29C 47/0004* (2013.01); *B29C 47/1009* (2013.01); *B29C 47/1027* (2013.01)

(58) Field of Classification Search
CPC B29C 47/585; B29C 47/004; B29C 47/1009; B29C 47/1027
USPC .......... 425/205; 264/459, 1.29; 366/83, 91, 2, 366/35, 38, 30
See application file for complete search history.

(56) References Cited

U.S. PATENT DOCUMENTS

| | | |
|---|---|---|
| 3,559,240 A | 2/1971 | Kosinsky et al. |
| 3,850,888 A | 11/1974 | Fitzgerald et al. |

(Continued)

FOREIGN PATENT DOCUMENTS

| | | |
|---|---|---|
| DE | 19536944 A1 | 4/1997 |
| DE | 19940521 A1 | 4/2001 |

(Continued)

OTHER PUBLICATIONS

Pnzielli, Jun. 19, 2008, WO2008/071782.*
(Continued)

*Primary Examiner* — Tony G Soohoo
*Assistant Examiner* — Anshu Bhatia
(74) *Attorney, Agent, or Firm* — Dykema Gossett PLLC

(57) ABSTRACT

The invention relates to a method for treating a monomer, pre-polymer, polymer or a corresponding mixture, in particular for producing a dope for producing a polymer fiber, in particular a p-aramide fiber, in which the monomer, pre-polymer, polymer, additives or a corresponding mixture is admixed with a solvent, blended, fused, homogenized and/or degassed and then discharged, which takes place at least partially in a reactor (7), is to force-feed the monomer, pre-polymer, polymer or a corresponding mixture into the reactor (7) using a force-feed device (4).

11 Claims, 1 Drawing Sheet

(51) Int. Cl.
  *D01D 1/02*   (2006.01)
  *B29C 47/00*  (2006.01)
  *B29C 47/10*  (2006.01)
  *D01F 6/60*   (2006.01)

(56) References Cited

U.S. PATENT DOCUMENTS

| | | | | |
|---|---|---|---|---|
| 3,988,010 | A | * | 10/1976 | Paster ..................... 366/176.1 |
| 4,885,356 | A | | 12/1989 | Milligan et al. |
| 7,264,460 | B2 | * | 9/2007 | Munz et al. .................... 425/205 |
| 7,469,629 | B2 | * | 12/2008 | Fava et al. .................... 425/208 |
| 2002/0186612 | A1 | * | 12/2002 | Murakami et al. ............ 366/79 |
| 2004/0253335 | A1 | * | 12/2004 | Anderson et al. ............. 425/205 |
| 2008/0138739 | A1 | * | 6/2008 | Chung et al. ............ 430/137.14 |
| 2008/0310251 | A1 | * | 12/2008 | Innerebner et al. ............. 366/75 |
| 2010/0063205 | A1 | | 3/2010 | Koenders |
| 2010/0160525 | A1 | | 6/2010 | Geisler et al. |

FOREIGN PATENT DOCUMENTS

| | | |
|---|---|---|
| DE | 10120391 A1 | 11/2002 |
| DE | 10150900 C1 | 4/2003 |
| EP | 0422454 B1 | 12/1992 |
| EP | 0451747 B1 | 8/1995 |
| EP | 0517068 B1 | 9/1995 |
| EP | 0804278 B1 | 12/1998 |
| JP | 5247850 A | 4/1977 |

OTHER PUBLICATIONS

European Patent Office; International Search Report and Written Opinion issued in corresponding PCT/EP2010/004822. Date of Mailing: Mar. 25, 2011.

European Patent Office; International Preliminary Report on Patentability issued in corresponding PCT/EP2010/004822. Date of Mailing: Nov. 17, 2011.

* cited by examiner

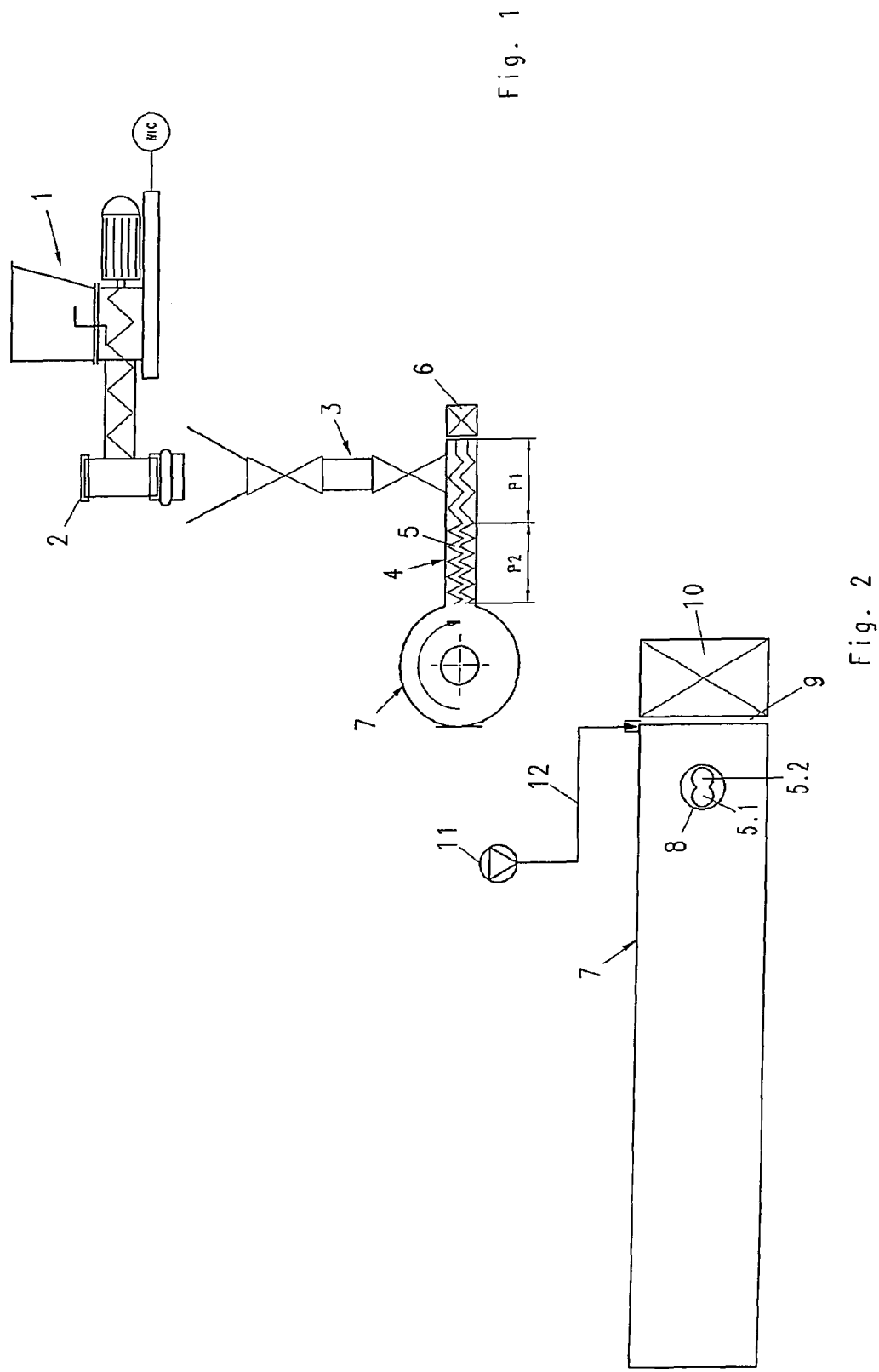

METHOD FOR TREATING A MONOMER, PRE-POLYMER, POLYMER OR A CORRESPONDING MIXTURE

CROSS-REFERENCE TO RELATED APPLICATION

This application is a national stage filing based upon International PCT Application No. PCT/EP2010/004822, with an international filing date of Aug. 6, 2010, which claims the benefit of priority to German Application No. 102009036915.5, filed Aug. 11, 2009, each of which are fully incorporated herein by reference as though fully set forth herein.

The invention relates to a method for treating a monomer, pre-polymer, polymer or a corresponding mixture, in particular for the production of a spinning solution for the production of a polymer fiber, in particular a p-aramid fiber, wherein the monomer, pre-polymer, polymer, additives or a corresponding mixture is blended with a solvent, mixed, melted, homogenized and/or degassed and then discharged, which takes place at least in part in a reactor, as well as an apparatus for this purpose.

BACKGROUND

Synthetic fibers are currently needed for many applications in the private and industrial spheres. For example, this applies to all types of garments, reinforcing fabrics, industrial textiles, wear pads, filters, etc. For this purpose the corresponding polymer, which is usually present in piece or in powder form, is mixed with a solvent, melted, homogenized, degassed and then fed, still in the viscous state, to nozzles, from which it is then extruded at high pressure to form the fibers.

For example, a method is known from WO2008/138597 in which liquid sulfuric acid is used as a solvent and at least the mixing, homogenization and degassing take place in a preferably continuously operated single-shaft or twin-shaft reactor. This eliminates the need for the hitherto necessary cooling of the sulfuric acid to below its coagulation point, making the entire process significantly simpler and less costly

BRIEF SUMMARY

The object of the present invention is to still further improve the method known from WO 2008/138597 and to increase the product quality.

The object is attained in that the monomer, pre-polymer, polymer or a corresponding mixture is force fed into the reactor by means of a force-feed device.

Force feeding the product has the advantage that the product is compacted or compressed before it enters the reactor, so that it can be fed into the reactor virtually free from dead spots. Air inclusions are also thereby avoided, so that the treatment of the product in the reactor takes place much more efficiently. Furthermore, the forced conveyance has the advantage that the transport of the product is no longer dependent on the force of gravity, instead the product is actively moved further.

The feed into the reactor is preferably carried out near to an end face of the reactor, so that no loss of mixing length occurs in the reactor, since the first reactor zone after the end face can already be used as a mixing chamber. For this reason a feed of in particular solvent also takes place close to the end face of the reactor.

Several possibilities are conceivable as a force-feed device, only a few of which are mentioned below by way of example. It is essential that sufficient force/pressure is applied to the product by means of the force-feed device so that a force feed can take place. This can be carried out, for example, in a pneumatic or hydrostatic manner, or with a corresponding pump. However, a mechanical device is preferred, which, again preferably, has/have at least one, preferably two, conveying screws which intermesh with one another. The conveying screw is thereby embodied flush with the wall, that is, its outer diameter corresponds approximately to the inner diameter of a housing in which the conveying screw rotates.

To build up a corresponding pressure, the pitch of the screw can be different. For example, the pitch of the screw close to the charge of the product is embodied to be larger, but is reduced in the further course so that the product transport takes place more slowly, but the product is compressed thereby.

The product itself, in particular the monomer, pre-polymer, polymer, additives or a corresponding mixture thereof, can be present in a different physical state. For example, powder form is considered.

The solvent itself can be fed at any desired location and/or in any desired orientation into the reactor and/or into the force-feed device, wherein with the latter option the product is already premixed in the force-feed device. The feed of the solvent into the reactor preferably takes place close to the feed zone between the force-feed device and the reactor and there in turn close to the end face of the reactor.

In the feed zone itself, a thermal influencing of the product can also take place, which contains a greater depth action. For example, heat is hereby introduced better and more intensively into the product.

If desired, several force-feed devices can also be assigned to the reactor, so that different products can also be fed into the reactor, which, for example, then react with one another in the reactor. Many possibilities are conceivable here, which are to be covered by the inventive concept.

Above all a kneader mixer is used as a reactor.

Kneader mixers of this type are used for a great variety of purposes. Evaporation with solvent recovery should be mentioned first, which takes place in a batchwise or continuous manner and also often under a vacuum. For example, distillation residues can be treated hereby, but also production residues with toxic or high-boiling solvents from the chemical industry and pharmaceutical production, wash solutions and paint sludges, polymer solutions, elastomer solutions from solvent polymerization, adhesives and sealing compounds.

The apparatuses are also used for carrying out continuous or batchwise contact drying, of water-moist and/or solvent-moist products, often likewise under a vacuum. The application is intended above all for pigments, dyes, fine chemicals, additives, such as salts, oxides, hydroxides, antioxidants, temperature-sensitive pharmaceutical and vitamin products, active substances, polymers, synthetic rubbers, polymer suspensions, latex, hydrogels, waxes, pesticides and residues from chemical or pharmaceutical production, such as salts, catalysts, slags, waste liquors. These processes are also applied in food production, for example, in the production and/or treatment of block milk, sugar substitutes, starch derivatives, alginates, for the treatment of industrial sludges, oil sludges, bio sludges, paper sludges, paint sludges and generally for the treatment of tacky, crust-forming, viscous-pasty products, waste products and cellulose derivatives.

In kneader mixers, degassing and/or devolatilization can take place. This is applied to polymer melts, to spinning solutions for synthetic fibers and to polymer or elastomer granules or powder in the solid state In a kneader mixer a polycondensation reaction can take place, usually continuously and usually in the melt and is used above all in the treatment of polyamides, polyesters, polyacetates, polyamides, thermoplastics, elastomers, silicones, urea resins, phenolic resins.

A polymerization reaction can also take place, likewise usually continuously. This is applied to polyacrylates, hydrogels, polyols, thermoplastic polymers, elastomers, syndiotactic polystyrene and polyacrylamides.

Quite generally, solid/liquid and multi-phase reactions can take place in the kneader mixer. This applies in particular to back-reactions, in the treatment of hydrofluoric acid, stearates, cyanates, polyphosphates, cyanuric acids, cellulose derivatives, cellulose esters, cellulose ethers, polyacetal resins, sulfanilic acids, Cu-phthalocyanines, starch derivatives, ammonium polyphosphates, sulfonates, pesticides and fertilizers.

Furthermore, solid/gas reactions (for example, carboxylation) or liquid/gas reactions can take place. This is applied in the treatment of acetates, azides, Kolbe-Schmitt reactions, for example, BON, Na salicylates, parahydroxybenzoates and pharmaceutical products.

Liquid/liquid reactions take place, for example, in the case of neutralization reactions and transesterification reactions.

Dissolution and/or degassing in kneader mixers of this type take place with spinning solutions for synthetic fibers, polyamides, polyesters and celluloses.

A solid-state post-condensation takes place in the production or treatment of polyesters and polyamides, a continuous slurrying, for example, in the treatment of fibers, for example, cellulose fibers, with solvents, crystallization from the melt or from solutions in the treatment of salts, fine chemicals, polyols, alcoholates, compounding, mixing (continuously and/or batchwise) in the case of polymer mixtures, silicone compounds, sealing compounds, fly ash, coagulation (in particular continuously) in the treatment of polymer suspensions.

In a kneader mixer, multi-functional processes can also be combined, for example, heating, drying, melting, crystallizing, mixing, degassing, reacting—all of these continuously or batchwise. Polymers, elastomers, inorganic products, residues, pharmaceutical products, food products, printing inks are produced or treated in this manner.

In kneader mixers, vacuum sublimation/desublimation can also take place, whereby chemical precursors, for example anthraquinone, metal chlorides, organometallic compounds, etc., are purified. Furthermore, pharmaceutical intermediate products can be produced.

A continuous carrier-gas desublimation takes place, for example, in the case of organic intermediate products, for example, anthraquinone and fine chemicals.

Kneader mixers can be single-shaft or dual-shaft, rotate in the same direction or the opposite direction at the same or a different speed.

A kneader mixer of the type mentioned above is known from EP 0 517 068 B 1, for example. There two shafts running axially parallel rotate in the opposite direction or in the same direction in a mixer housing. In this case, mixing bars mounted on disk elements act with one another. Apart from the function of mixing, the mixing bars have the task of cleaning as well as possible surfaces of the mixer housing, of the shafts and of the disk elements that are in contact with the product and of thereby avoiding unmixed zones. Particularly in the case of highly compacting, hardening and crust-forming products, the ability of the mixing bars to reach the edges leads to high local mechanical loading of the mixing bars and of the shafts. These force peaks occur in particular when the mixing bars engage in those zones where the product finds it difficult to escape. Such zones are present, for example, where the disk elements are mounted on the shaft. Further kneader mixers are described in DE 590 00 547.2, DE 591 06 245.3, DE 592 03 529.8, DE 195 36 944.0, DE 596 00 991.7, DE 199 40 521.2, DE 101 20 391.8, DE 101 50 900.6, etc. However, the invention is not limited thereto. Other mixers, extruders or the like can also be used.

BRIEF DESCRIPTION OF THE DRAWINGS

Further advantages, features and details of the invention are shown by the following description of preferred exemplary embodiments and based on the drawing; they show FIG. 1 an apparatus shown diagrammatically or in the manner of a block diagram for carrying out the method according to the invention for treating a monomer, pre-polymer, polymer or a corresponding mixture;

FIG. 2 a diagrammatic and block-diagram representation of parts of the apparatus according to FIG. 1.

DETAILED DESCRIPTION

In the apparatus according to FIG. 1*a* metering device 1 is provided, in which a gravimetric metering of the product to be treated takes place. This product is discharged via a discharge device 2 into a powder chute 3. From the powder chute 3, the product reaches a conveyor device 4, in which at least one conveying screw 5 is located. A corresponding drive 6 for this conveying screw is likewise indicated.

In the exemplary embodiment shown, the conveying screw 5 has by zones two different pitches $P_1$ or $P_2$, the pitch $P_1$ being larger than the pitch $P_2$. This means that the product in the zone with the pitch $P_1$ is compressed less, but conveyed more quickly, while the compression is increased in the zone $P_2$.

From the conveyor device 4, the product reaches a kneader mixer 7, which can be embodied as desired. A corresponding feed zone 8 is located according to FIG. 2 very close to an end face 9 of the kneader mixer 7, wherein a conveyor device with two conveying screws 5.1 and 5.2 is also indicated in the feed zone 8.

Corresponding mixing and kneading elements known from the prior art, in particular mixing and kneading shafts, are driven by a motor 10 provided close to the end face 9.

Furthermore, the addition of a solvent or a desired liquid takes place close to the end face 9 or above the inlet 8, for which purpose a metering pump 11 is provided. The corresponding supply tube from the metering pump 11 into the kneader mixer 7 is labeled by 12.

The mode of operation of the present invention is as follows:

A product to be treated, in particular a monomer, prepolymer, polymer additive or a corresponding mixture is metered in the metering device 1 and fed via the discharge device 2 and the powder chute 3 into the conveyor device 4 (force-feed device). As a result of the design of the conveying screw/s, a compacting of the product takes place, wherein a pressure on the product is built up. The result of this is that the product is force fed into the kneader mixer 7 virtually free of dead zones. This takes place in turn near to the end face 9 of the kneader mixer 7, so that almost 100% of the mixing length of the kneader mixer 7 can be utilized. In addition, the liquid, in particular the solvent, is fed in through the metering pump 11 very close to the end face 9 into the kneader mixer 7.

The invention claimed is:

1. A method for treating a monomer, pre-polymer, polymer or a corresponding mixture for the production of a spinning solution for the production of a polymer fiber, wherein a monomer, pre-polymer, polymer, additive or a corresponding mixture is blended with a solvent, the blended mixture including the solvent is mixed, melted, homogenized and/or degassed and then discharged, which takes place at least in part in a reactor configured for continuous operation, wherein the monomer, pre-polymer, polymer, additive or corresponding mixture is force fed into the reactor by a force-feed device, with which force or pressure is built up towards the reactor at least in part by a conveying screw including a first zone with a first pitch and at least a second zone with a second pitch, wherein the first pitch is different from the second pitch and from pitches associated with subsequent zones, and the compression of the monomer, pre-polymer, polymer, additive, or a corresponding mixture is greater in the second zone than in the first zone, and wherein the monomer, pre-polymer, polymer or a corresponding mixture, in response to the force or pressure being built up towards the reactor, is compacted or compressed and is then fed into the reactor virtually free from dead spots.

2. The method of claim 1, wherein the monomer, pre-polymer, polymer or a corresponding mixture is fed into the reactor pneumatically.

3. The method of claim 1, wherein the monomer, pre-polymer, polymer or a corresponding mixture is pumped into the reactor hydrostatically.

4. The method of claim 1, wherein the monomer, pre-polymer, polymer or a corresponding mixture comprises a powder.

5. The method of claim 1, wherein the monomer, pre-polymer, polymer or a corresponding mixture is premixed with the solvent prior to being fed into the reactor.

6. The method of claim 1, wherein the solvent is fed at different points into the force-feed device or the reactor or both the force-feed device and the reactor.

7. The method of claim 6, wherein the solvent is fed at the different points in different quantities.

8. The method of claim 1, wherein the monomer, pre-polymer, polymer or a corresponding mixture is fed into the reactor close to an end face of the reactor.

9. The method of claim 1, wherein the second zone of the conveying screw is directly adjacent to the reactor and the first zone of the conveying screw, and the first zone is directly adjacent to the second zone.

10. The method of claim 1, wherein the monomer, pre-polymer, polymer or a corresponding mixture is thermally influenced while in the force-feed device.

11. The method of claim 1, wherein the force feed device and reactor generally are within the same horizontal plane, such that transport of the monomer, pre-polymer, polymer, additive, or a corresponding mixture therefrom is not dependent on gravity.

* * * * *